US012721458B2

(12) United States Patent
Smith

(10) Patent No.: US 12,721,458 B2
(45) Date of Patent: Sep. 1, 2026

(54) BEDSHEET WITH CHILDREN'S STORY BOOK, GAME AND PLUSH

(71) Applicant: Annette Bentley Smith, McDonough, GA (US)

(72) Inventor: Annette Bentley Smith, McDonough, GA (US)

(*) Notice: Subject to any disclaimer, the term of this patent is extended or adjusted under 35 U.S.C. 154(b) by 64 days.

(21) Appl. No.: 17/750,376

(22) Filed: May 22, 2022

(65) Prior Publication Data

US 2023/0404300 A1 Dec. 21, 2023

(51) Int. Cl.

| | |
|---|---|
| ***A47G 9/02*** | (2006.01) |
| ***A47G 9/10*** | (2006.01) |
| ***A63H 3/00*** | (2006.01) |
| ***A63H 3/02*** | (2006.01) |
| ***A63H 3/28*** | (2006.01) |
| ***A63H 33/00*** | (2006.01) |
| ***G09B 17/00*** | (2006.01) |

(52) U.S. Cl.
CPC ............ *A47G 9/0238* (2013.01); *A47G 9/10* (2013.01); *A63H 3/003* (2013.01); *A63H 3/02* (2013.01); *A63H 3/28* (2013.01); *G09B 17/00* (2013.01)

(58) Field of Classification Search
CPC . A63H 3/003; A63H 3/02; A63H 3/28; A63H 33/00; A63H 33/38; A63H 2200/00; A47G 9/00; A47G 9/02; A47G 9/0207; A47G 9/0223; A47G 9/0238; A47G 9/1045; G09B 17/00; G09B 19/00
USPC ............ 5/482, 904, 907; 446/71, 72, 73, 81, 446/147, 268, 297, 369; 434/159, 178
See application file for complete search history.

(56) References Cited

U.S. PATENT DOCUMENTS

| | | | | | |
|---|---|---|---|---|---|
| 2,078,022 | A | * | 4/1937 | Roemer | A63F 9/088 5/655 |
| 3,120,721 | A | * | 2/1964 | Bukatman | A63H 33/00 5/482 |
| 3,593,433 | A | * | 7/1971 | Dillon | G09B 17/006 446/302 |
| 3,797,146 | A | * | 3/1974 | Holes | B42F 5/00 D19/27 |
| 4,590,633 | A | * | 5/1986 | Pickens | A63H 3/005 5/413 R |
| 4,754,512 | A | * | 7/1988 | Chao-Yang | A47D 15/003 446/73 |
| 4,768,245 | A | * | 9/1988 | Dutton | A47G 9/1045 5/636 |

(Continued)

*Primary Examiner* — Alexander R Niconovich
(74) *Attorney, Agent, or Firm* — Alexander R Niconovich

(57) ABSTRACT

A bedsheet with a storybook, find word game for children and a koala plush is disclosed. This system includes a flat top sheet consisting of a storybook printed on 20 smaller square-shaped sheets, a find word game, a keyboard, an open book with questions about the storybook, and encouraging affirmations to help a child develop good behavior. The system also includes a flat bottom sheet consisting of encouraging affirmations and copies of the book cover printed on it. The system further consists of a koala bear plush with a button for recording and a button for playing a story/message located inside the ears, a pillow and carrying straps attached to the plush and having a book with pages which serve as pouches, a ball of yarn piece for playing the find word game, a separate pouch for storing more storybooks, and two external re-recordable sound/voice modules for recording stories, songs and messages.

6 Claims, 11 Drawing Sheets

(56) References Cited

U.S. PATENT DOCUMENTS 4,853,994 A * 8/1989 Ekstein ................ A47G 9/1045 281/31
4,874,340 A * 10/1989 Smallwood ............ A63H 3/005 446/72
4,874,344 A * 10/1989 Kanter ................... A63H 3/005 446/268
4,875,245 A * 10/1989 Isola ........................ A47G 9/02 5/490
4,911,670 A * 3/1990 McNicholas ............ A63H 3/52 446/487
4,972,533 A * 11/1990 Brown ................. A47G 9/0207 5/413 R
5,084,930 A * 2/1992 Danova ................ A47G 9/0207 446/76
5,167,565 A * 12/1992 Metcalf ..................... A63F 9/06 446/491
5,421,045 A * 6/1995 Bowen ................. A47G 9/1045 446/73
5,540,609 A * 7/1996 Hoag ....................... A63H 3/50 5/907
5,665,448 A * 9/1997 Graham .................... G09F 7/12 428/542.2
5,778,468 A * 7/1998 Saarela .................. A63H 3/003 5/639
5,795,213 A * 8/1998 Goodwin ................. A63H 3/28 446/302
5,813,866 A * 9/1998 Maeda ................... G09B 17/00 434/430
6,128,794 A * 10/2000 Pariseau ................ A47G 9/083 5/413 R
6,301,731 B1 * 10/2001 Jakubowski ........... A47D 13/06 5/98.1
6,427,265 B1 * 8/2002 Dix ........................ A47D 15/00 5/655
6,557,192 B2 * 5/2003 Zheng ..................... A63F 9/001 5/413 R
6,684,422 B2 * 2/2004 LeFevre ................... A61G 5/10 5/655
6,940,432 B1 * 9/2005 Hall ....................... A63H 3/003 341/110
7,028,870 B2 * 4/2006 Valdez-Campbell ........................ A45C 7/0095 224/684
7,194,958 B2 * 3/2007 Brasier ..................... D06P 5/30 101/485
7,217,132 B2 * 5/2007 Knepper .................. G09B 1/00 434/367
7,227,965 B1 * 6/2007 Sutton .................. A47G 9/1045 381/124
7,467,985 B2 * 12/2008 Manrique .............. A63H 33/38 446/108
7,757,416 B2 * 7/2010 Shearrow ............. A47G 9/0284 38/102.91
7,987,536 B1 * 8/2011 Habig .................... A47G 9/086 5/413 R
8,381,334 B2 * 2/2013 Ballard .................. A47G 9/062 5/655
8,668,543 B2 * 3/2014 Manrique ............ A63H 33/008 446/108
D898,454 S * 10/2020 Coleman ........................ D6/603
11,135,526 B1 * 10/2021 Fields ................... A47F 5/0884
11,141,669 B2 * 10/2021 Candelore ................ A63H 3/28
11,224,257 B2 * 1/2022 Merritt ................... A41D 10/00
2002/0020019 A1 * 2/2002 Koenig ................ A47G 9/0207 5/636
2004/0199998 A1 * 10/2004 Shinner ................ A47G 9/1045 5/482
2006/0148375 A1 * 7/2006 Leleu ..................... A63H 3/003 281/29
2007/0087655 A1 * 4/2007 Rifkin ...................... A63H 3/52 446/268
2010/0125298 A1 * 5/2010 Whitney .............. A47G 9/0223 446/268
2011/0301957 A1 * 12/2011 Brown ................ H04L 67/1078 704/E11.001
2012/0020586 A1 * 1/2012 Gilbert ............... A47G 27/0243 383/4
2012/0108137 A1 * 5/2012 Sutton .................... A63H 3/005 446/73
2012/0297541 A1 * 11/2012 Brown ..................... A47G 9/02 5/493
2014/0259408 A1 * 9/2014 Morley .................... A47G 9/02 5/482
2017/0291112 A1 * 10/2017 Bayne ....................... B32B 5/26
2018/0214784 A1 * 8/2018 Klein ....................... A63H 3/02
2019/0076745 A1 * 3/2019 Sapulich .............. A47G 9/1045
2019/0269185 A1 * 9/2019 Merritt ................. A41D 27/085
2025/0367568 A1 * 12/2025 Hijuelos .................. A47G 9/08

* cited by examiner

FIG 9
Don't be a bully
be a friend
Don't be a bully
be a friend
Don't be a bully
be a friend
Don't be a bully
be a friend
Don't be a bully
be a friend

BEDSHEET WITH CHILDREN'S STORY BOOK, GAME AND PLUSH

CROSS-REFERENCE TO RELATED APPLICATIONS

This application claims the benefit of U.S. Provisional Application No. 63/212,910 with application date of Jun. 21, 2021.

BACKGROUND OF INVENTION

Field of Invention

The present invention relates to bedsheets, and more particularly to a bedsheet for children having a story book, a keyboard, a find word game, recording modules, pillowcases and a koala plush.

Description of Related Art

Children learn through many different means and methods such as via physical or digital storybooks, games and other traditional materials or methods in order to help them to learn effectively. These methods may still popular today, however, they are not free of shortcomings.

Conventional learning materials are quite expensive to purchase, and not every parent may be able to afford them. In addition, parents may need to purchase all these materials separately (for instance buying books and toys separately), thereby, increasing costs of acquiring these materials all at once.

Due to the above mentioned shortcomings, it is highly desirable to have an improved learning system that boosts the level of child development and eliminates the problems discussed above.

The present invention therefore, provides an effective and easy solution to these shortcomings by providing different learning materials all in one package.

SUMMARY

The following summary provides an understanding of the features and functions of the present invention. One can easily understand of the invention by considering the whole specification, claims, drawings, as well as the abstract.

The major objective of the present invention is to provide an improved and more effective system of learning for children. More particularly, this invention aims to bring this learning system closer to children by providing these learning materials right on the bedsheet that the child sleeps on. This way, the child quickly gets familiar with the learning materials and this ultimately helps such child to learn more effectively.

In the present invention, a bedsheet with a story book and a word game is disclosed. The invention comprises a flat top sheet which further comprises of twenty square-shaped illustrations from the story book printed on it. The invention also comprises 20 smaller square-shaped sheets on which the story book text are printed, and which are fitted on each of the square-shaped illustrations.

The present invention also comprises an open book printed on the flat top sheet. The open book consists of questions about the story from the book. Furthermore, the invention comprises of a find word game, yarn pieces for the word game, and a keyboard printed on it. The keyboard is accompanied by a pair of keyboard learning hands with letters printed on each finger. The letters on each finger indicate what finger the child needs to use when tapping a specific part of the keyboard. The essence of the keyboard is for a child's imagination and to help the child learn how to write/type at the same time.

The top flat sheet further comprises encouraging affirmations printed on it and which include: "be a friend", "be bully proof", "show confidence", "bully free zone", "show compassion", "speak out", "never use violence", and "hate the action, not the bully".

The present invention further comprises a fitted bottom sheet which consists of images of the story book cover printed on it. The fitted bottom sheet also consists of the following affirmations: Don't Be A Bully!, My voice matters, I speak with kindness, I speak with love and I care about others. The essence of these affirmations is to help build the child's moral and behavioral development.

The present invention further comprises a pillow case with the affirmation "Don't be a bully" "be a friend" printed on both sides.

The invention also comprises a bed storage pouch fitted closure and which is designed to store more story books.

Lastly, the present invention comprises two external re-recordable sound/voice modules, a koala bear plush and a book. The re-recordable modules facilitate the recording of a new story, song or message to be replayed later. The koala plush is fitted with a pillow on the body, and a pair of straps attached to the pillow from behind to allow a child to carry the plush from the house to another location. The pillow further comprises a double zipper to allow the whole koala plush to be converted into a full pillow. The pillow also comprises an internal button in the right corner which if pressed, plays a pre-recorded story or message. The koala plush further comprises a button in the right ear which if pushed, records messages/stories and another button in the left ear which if pressed, plays back the recorded message/story. The book consists of four storage pouches serving as the inside pages of the book; two for housing the two re-recordable sound/voice modules, one for a family photo, and the last pouch to store the yarn piece for the find word game. The book is designed to be tucked into the belly of the plush.

DETAILED DESCRIPTION OF THE DRAWINGS

Detailed descriptions of the present invention according to the preferred embodiment, as illustrated in FIG. 1-10 of the drawings are provided herein.

Figure 1:
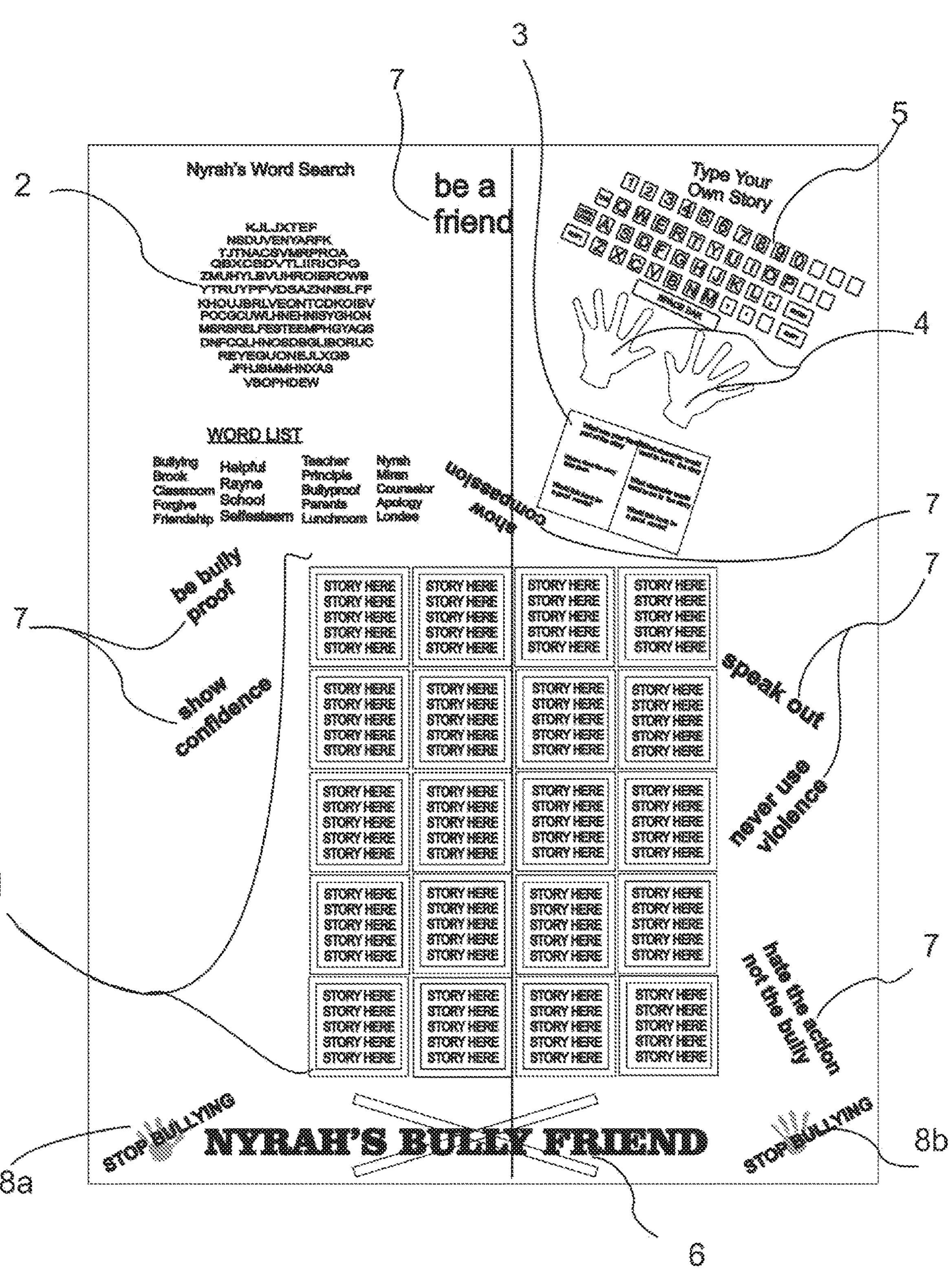
FIG. 1 is a top view of the top sheet of the present invention: a bedsheet with children's storybook and a find word game.

In FIG. 1, the present invention, a bedsheet with children's storybook and a find word game is disclosed. The invention comprises a flat top sheet having the following printed on it: a storybook 1 printed on twenty removable square-shaped sheets, a find word game titled "Nyrah's word search" 2 in an octagon shape and having the word list below it, a typing keyboard 5 titled "Type Your Own Story" having a standard keyboard layout, a pair of hands 4 below the keyboard, an open book 3 with questions about the story read from the story book, the following encouraging affirmations 7: be a friend, be bully proof, show confidence, bully free zone, show compassion, speak out, never use violence, and hate the action, not the bully. Also printed on the top flat sheet the story book title NYRAH'S BULLY FRIEND 6, positioned below the story book with an X crossing out the word "BULLY" and the affirmation "STOP BULLYING" 8*a*, 8*b* on both sides of the book title. Further, the "STOP BULLYING" affirmations are each printed on top of a handprint.

Figure 2:
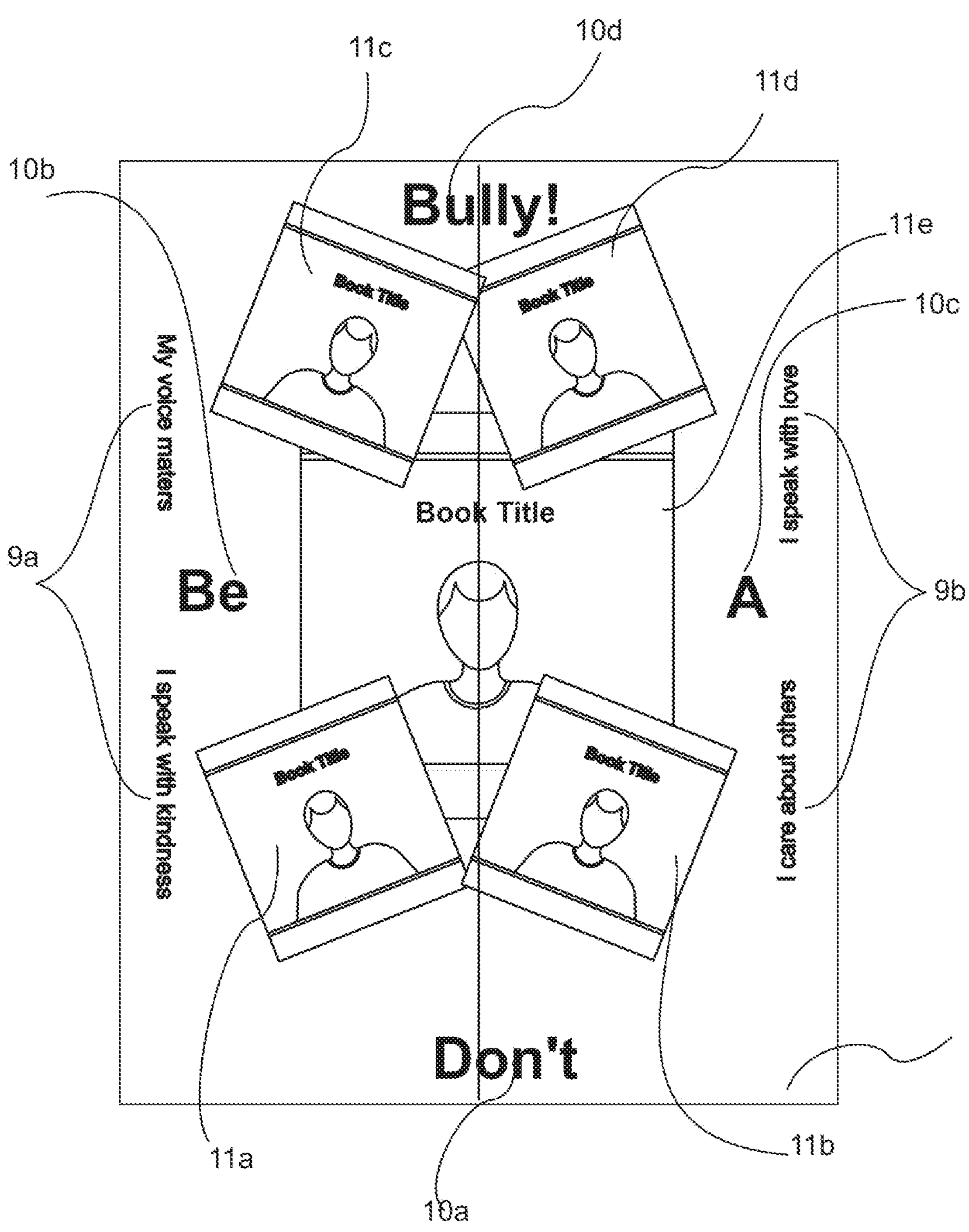
FIG. 2 is a top view of the bottom sheet of the present invention showing the story book cover and encouraging affirmations printed on it.
Figure 3:
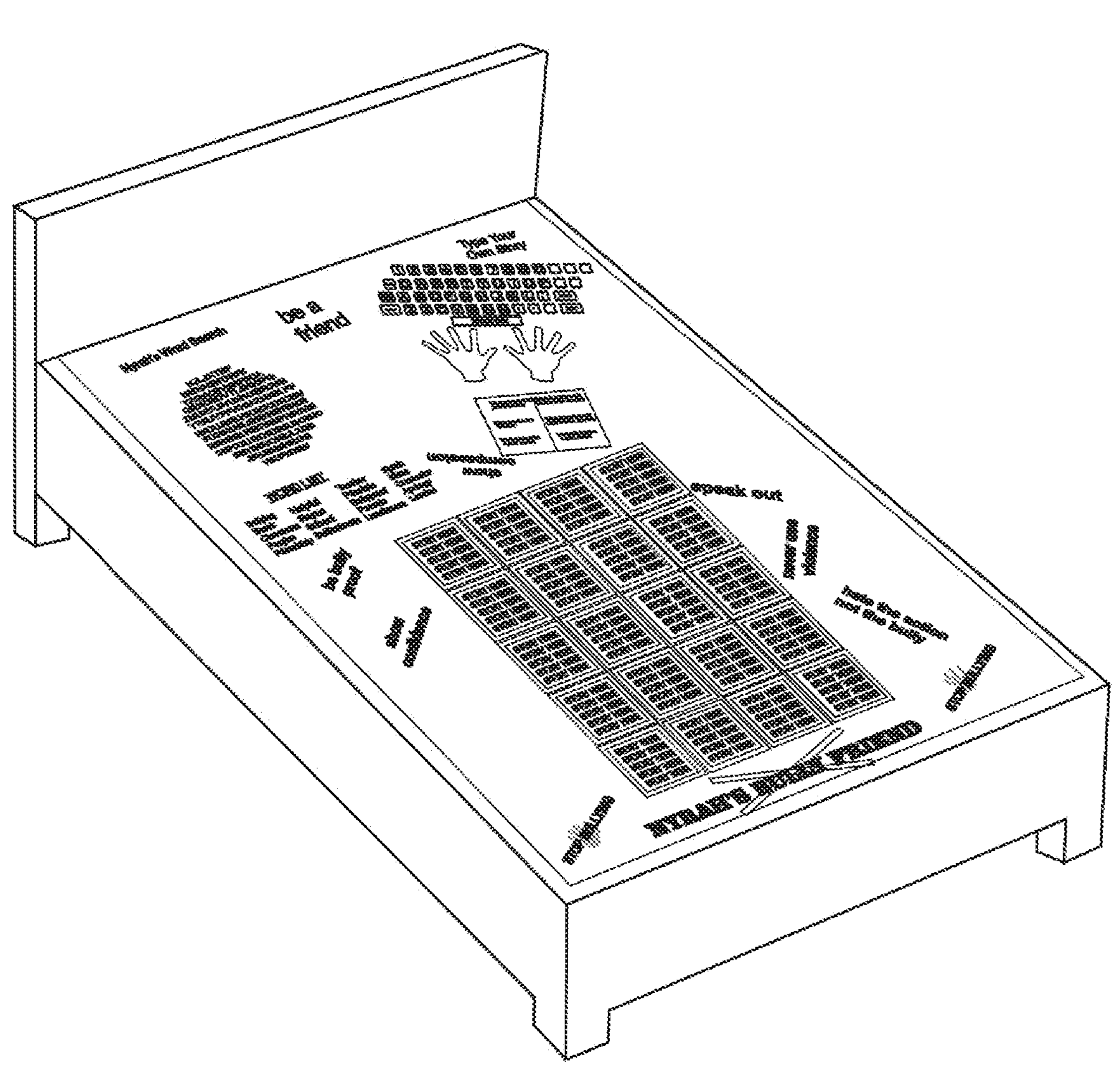
FIG. 3 is a perspective view of the present invention, showing the bedsheet on a bed.

FIG. 2 discloses the bottom sheet of the present invention comprising the story book cover 11*a-e*, the affirmation "Don't Be A Bully" 10*a-d*, and additional affirmations printed on both sides of the sheet 9*a*, 9*b*: My voice matters, I speak with kindness, I speak with love and I care about others. FIG. 3 discloses a perspective view of the top bedsheet as it appears on a laid bed.

Figure 4:
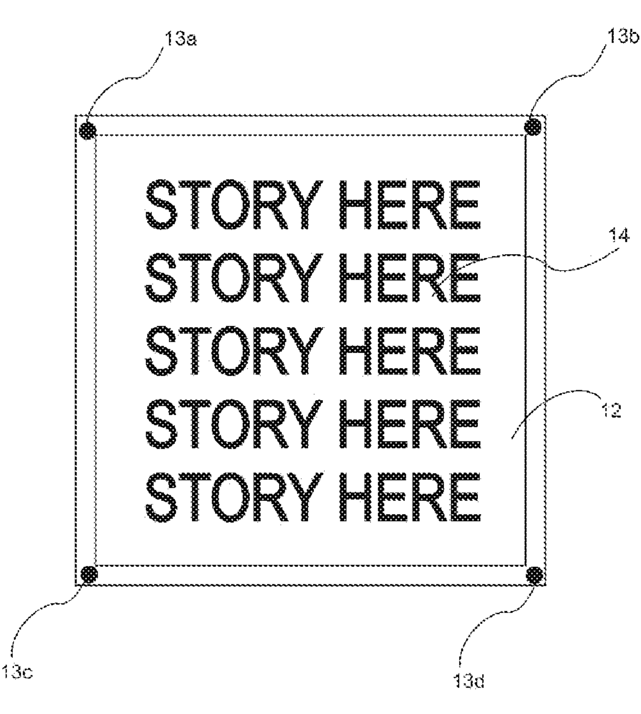
FIG. 4 shows the top view of one of the twenty square-shaped story book sheets in one position and another sheet flipped open in another position.
Figure 4:
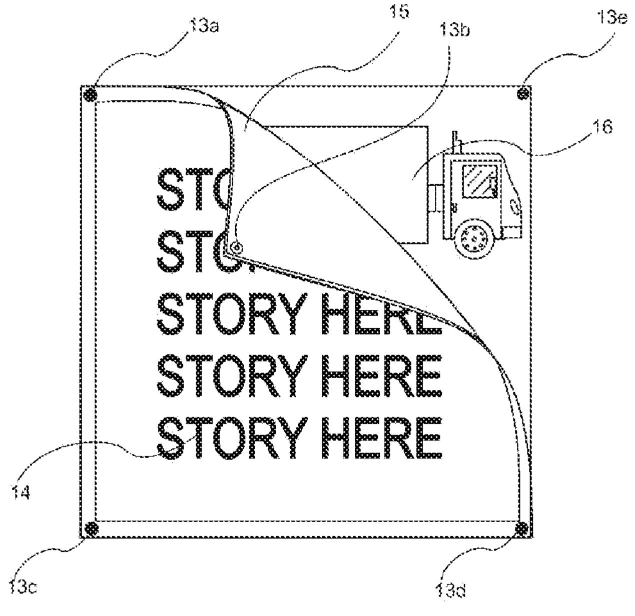

In FIG. 4, one of the twenty removable square-shaped sheets on which the story book is printed is disclosed 12. In the first position, the square-shaped sheet 12 is shown attached to the bedsheet at the four corners 13*a-d* and the story 14 is printed on top of the sheet. In the second position, the square-shaped sheet is flipped open from the top right edge revealing a square shaped illustration of the story. The story printed on the removable square-shaped sheet corresponds with the illustration.

Figure 5:
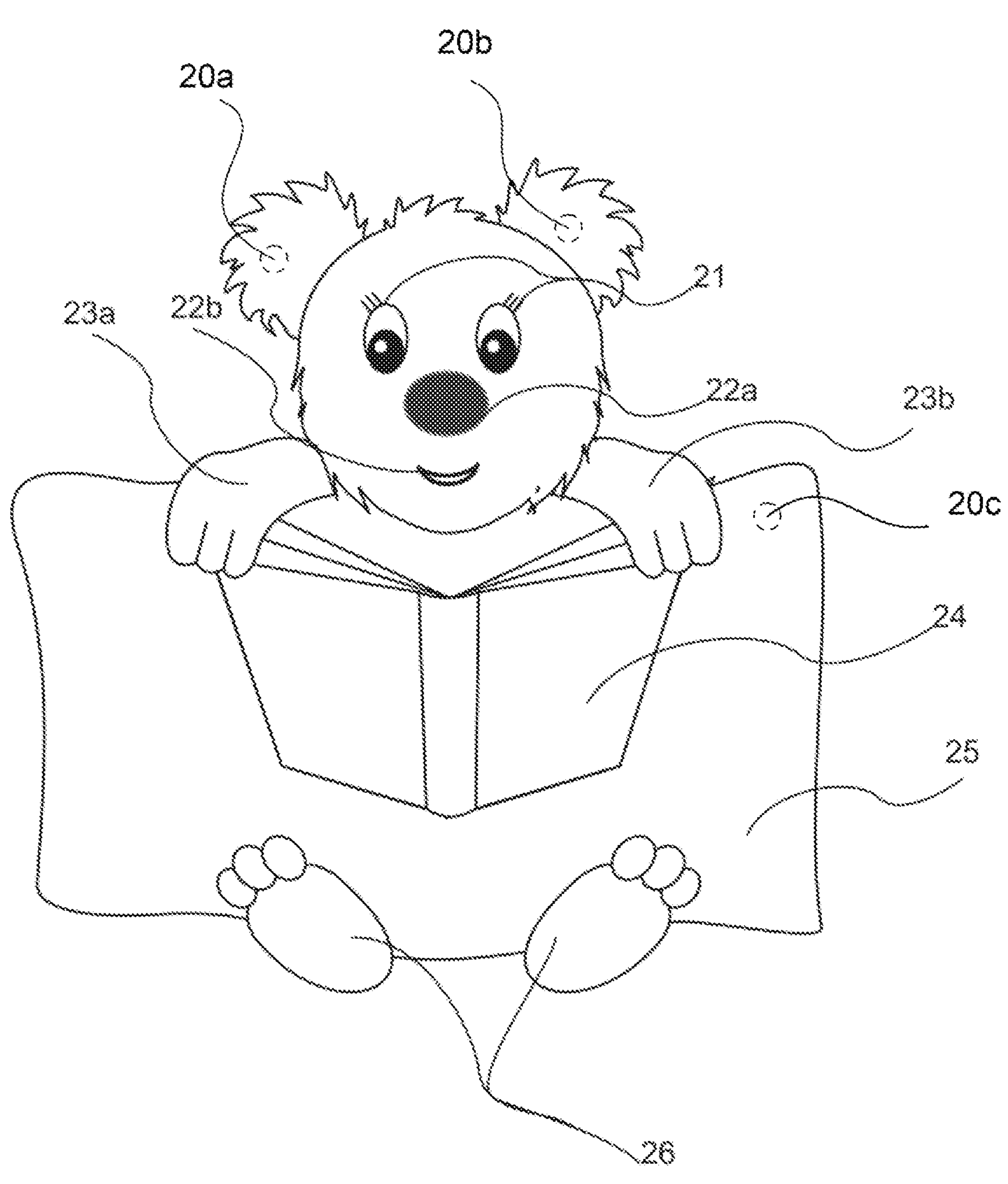
FIG. 5 is the front view of the koala plush fitted with a pillow and a book which acts as storage pouch for the re-recording modules, a family photo and the yarn piece for the find word game.

FIG. 5 discloses a koala plush fitted with a pillow and which is used in conjunction with the bedsheet described in FIG. 1. The koala plush consists of a button inside each of the two ears 20*a* and 20*b*, two eyes 21, a nose 22*a* and mouth 22*b*, a pair of hands 23*a*, a pair of feet 26, a pillow 25 attached to the koala and a book 24. The pillow part of the plush consists of another button 20*c* which when pressed, plays back a pre-recorded message or story. The button in the right ear 20*b* if pushed, records messages/stories and the second button in the left ear 20*a*, if pressed, plays back the recorded message/story.

Figure 6:
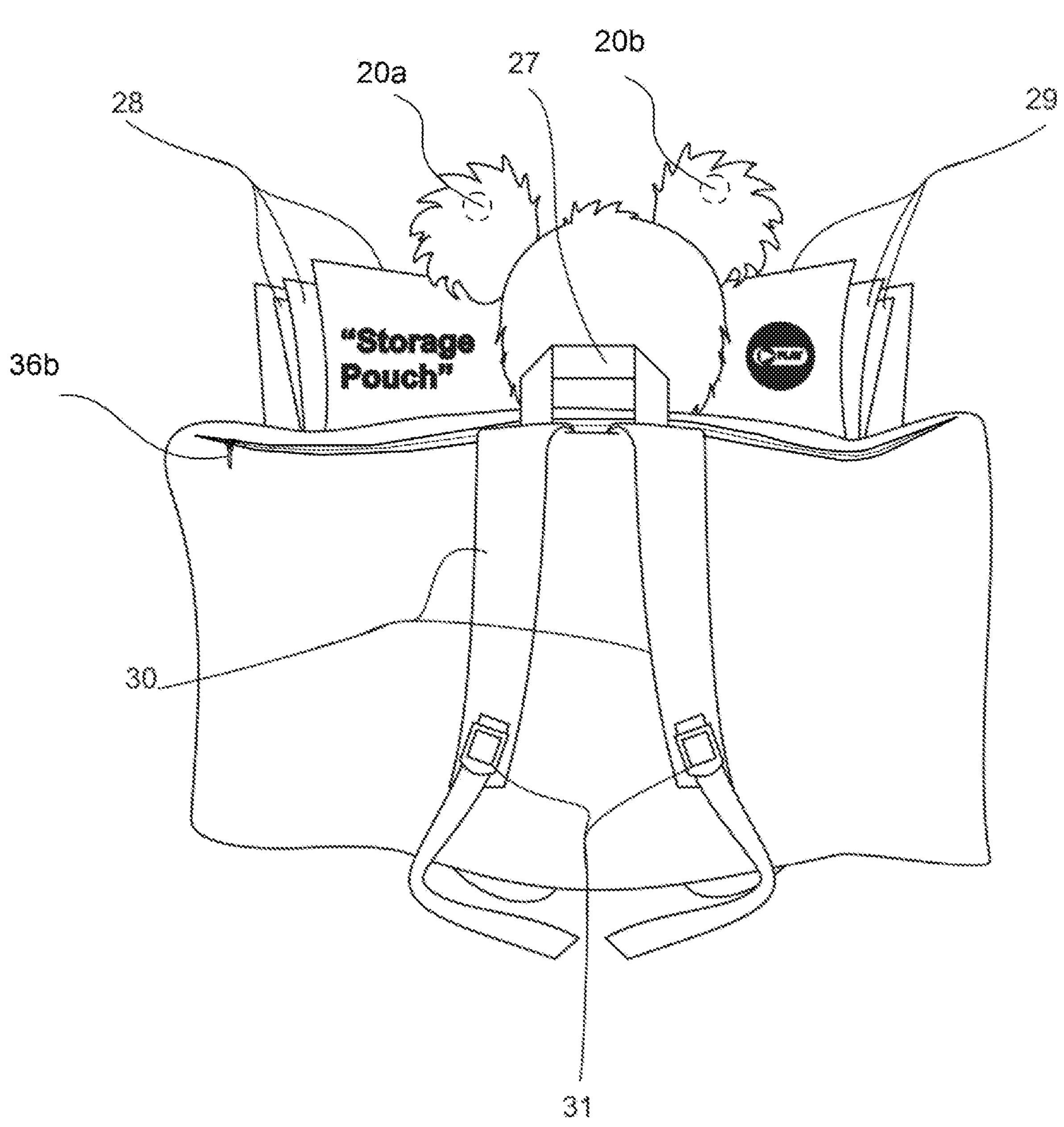
FIG. 6 is the back view of the koala plush showing straps for carrying the plush.

FIG. 6 discloses the back view of the koala plush consisting of twin straps 30 for easy carrying of the koala plush from a child's house to another location. The straps further have an adjustable system 31 to increase or decrease the length of the straps. The koala plush further consists of a handle loop 27 also for carrying the bag and located above the straps 30. FIG. 6 also discloses the inside pages 28, 29 of the book 24 disclosed in FIG. 5. The inside pages serve as a pouch for storing the re-recording modules, the yarn pieces for find word game and a family photo. 20*a* and 20*b* shows the location of the two buttons for recording and playing back messages and stories inside the left and right ears of the plush respectively. 36*b* is the zipper for converting the plush into a full pillow.

Figure 7:
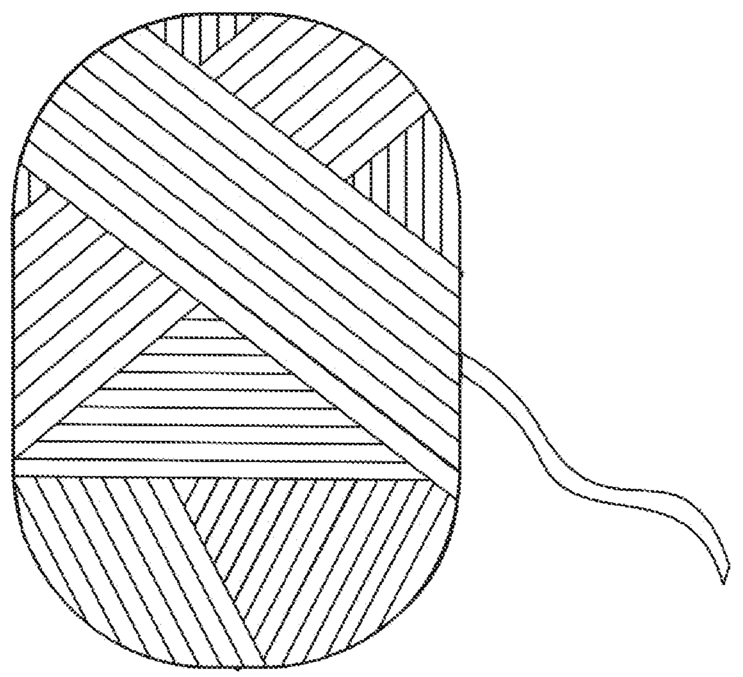
FIG. 7 shows the yarn pieces for playing the find word game.

FIG. 7 discloses the yarn pieces for the find word game described in FIG. 1. A child can play the find word game by using a piece of yarn to trace out the words provided in the word list of the game.

Figure 8:
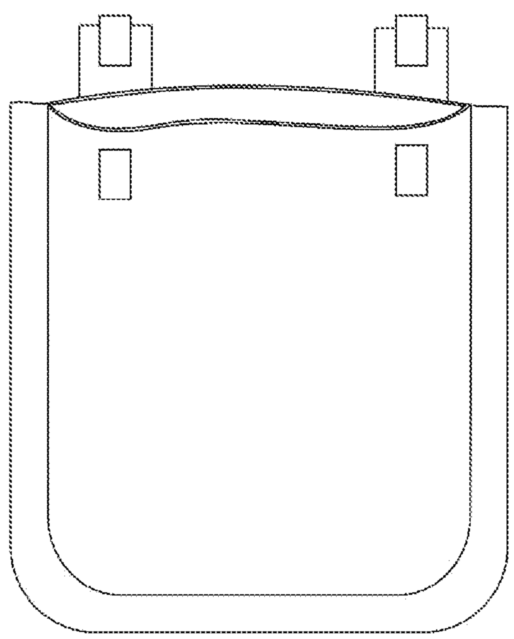
FIG. 8 shows the pouch for storing more storybooks.

FIG. 8 discloses a pouch for storing more story books which can be attached to the bedsheet disclosed in FIG. 1.

Figure 9:
FIG. 9 shows the front and back views of the pillow case for an extra pillow having encouraging affirmations printed on both sides.

FIG. 9 discloses a pillow case which is designed to be used with a separate pillow. The pillow case consists of the following encouraging affirmations "Don't be a bully" and "be a friend" on the corners of the front side and in the middle of the back side.

Figure 10:
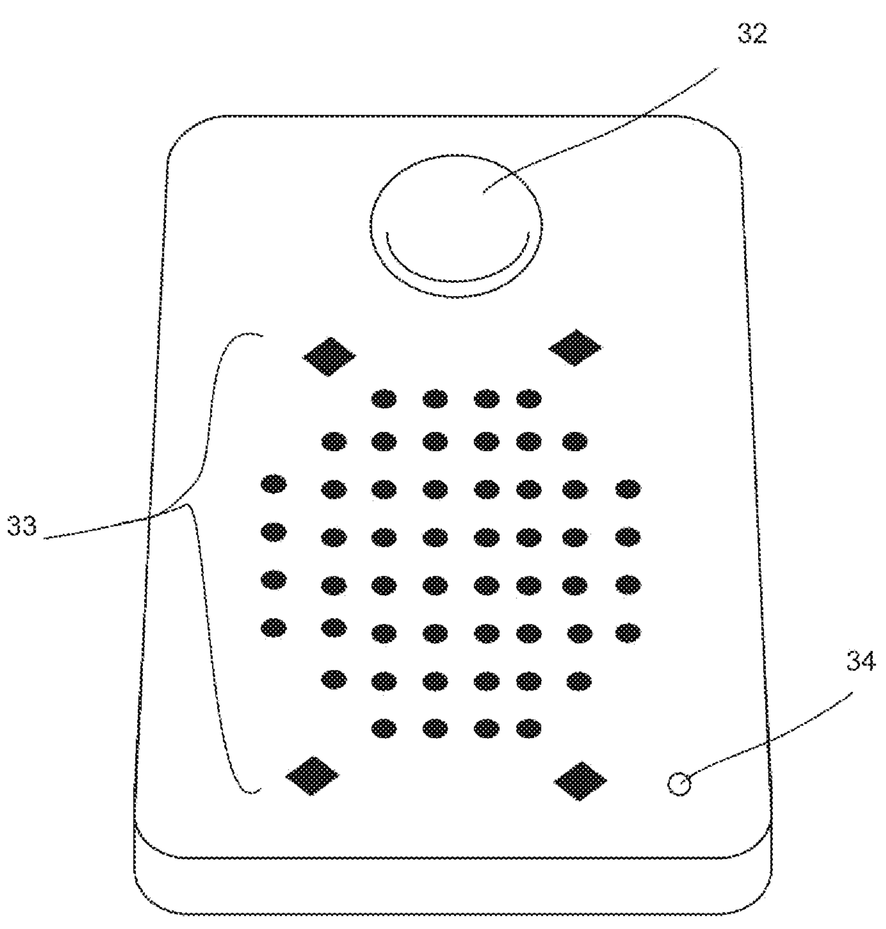
FIG. 10 shows the top view of one of two external sound/voice recording modules.
Figure 11:
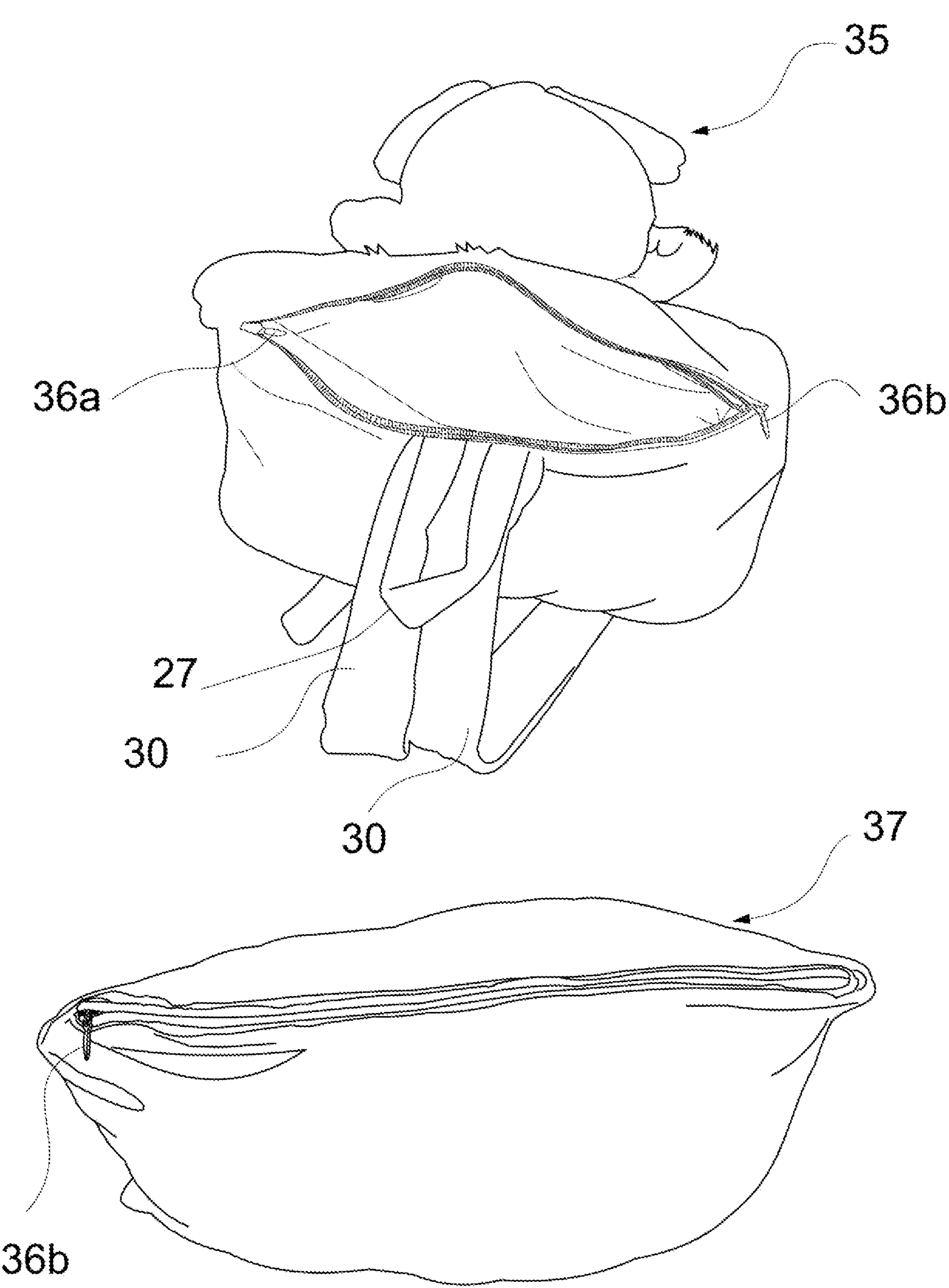
FIG. 11 shows the back view of the plush with the zipper opened and a side view of the plush converted into a full pillow.

FIG. 10 discloses one of two external re-recordable modules for recording stories, songs and messages to be replayed later. The module consists of a round shaped button 32 for starting the recording process, a speaker 33 for playing the recorded sound and an indicator light 34. FIG. 11 discloses the back view of the pillow part of the plush 35, the zippers for converting the plush into a full pillow 36*a* and 36*b*, the straps for carrying the plush on the back 30 and the handle loop 27. Also disclosed is the converted plush into full pillow 37.

The objective of the present invention is to provide a comprehensive and effective system of learning for a child. The child easily learns how to read from the story book 1 attached to the bedsheet as shown in FIG. 1. After reading the story, the child plays the find word game 2 which contains words from the book and also helps the child remember some of the new words learnt from the story. Furthermore, the child is encouraged to learn how to type by practicing on the keyboard 5 also printed on the bedsheet. Also, the present invention aims to teach the child good behavior as well as how to treat others through the affirmations: be a friend, be bully proof, show confidence, bully free zone, show compassion, speak out, never use violence, and hate the action, not the bully 7 printed all over the bedsheet, and STOP BULLYING 8*a*, 8*b* printed all over the bedsheet. Lastly, the invention also challenges the child in the learning process by asking questions provided on the open book 3 about what was learnt from the storybook.

It is important to note that the scope of the present invention is not limited in size, design specifics, materials from which they are made, or shapes. As such, other designs of the present invention require different styles, but the same concept with the embodiments described herein.

Alternative Embodiments of the Present Invention

In another embodiment of the present invention, the koala plush does not have the twin back straps and no opening in the back. However, it comprises a small opening on the right side for the module, a button in the left ear for music, a button in the right that's plays original children's book stories, a button in the left hand for volume, a button in the right hand for downloaded files, a button in the left foot for on/off switch and there's an earphone port, and USB port in the right foot, a book and a pillow.

The invention claimed is:

1. A learning system for children comprising:

a main story book having text for a child to read;

a bed sheet comprising:

a flat top sheet forming a play area having a plurality of sections formed thereon, the plurality of sections being spaced apart, an open book having text printed on the play area in a first section of the plurality of sections of the flat top sheet, the open book text being questions about the text of the main story book, a find word game formed on the play area in a second of the plurality of sections of the flat top sheet, the find word game having a plurality of spaced lettered indicia printed thereon, some of the lettered indicia forming words from the text of the main story book hidden within the plurality of spaced lettered indicia for a child to find, a typing keyboard formed on the play area in a third section of the plurality of sections of the flat top sheet, the typing keyboard being formed with a plurality of parts having different indicia printed on each of the plurality of parts, a pair of hands formed on the play area in a fourth section of the plurality of sections of the flat top sheet and positioned adjacent and below the typing keyboard, the pair of hands having indicia printed on respective fingers corresponding to the indicia printed on the plurality of parts of the typing keyboard, indicia showing affirmations of encouragement of a child's healthy behavior being printed on the play area in a fifth section of the plurality of sections of the flat top sheet, the affirmations of encouragement corresponding to the text of the main story book, a plurality of square shaped illustrations printed on the play area in a sixth section of the plurality of sections of the flat top sheet, the square shaped illustrations corresponding to the text of the main story book, a plurality of smaller square-shaped sheets, each of the smaller square-shaped sheets having text printed thereon corresponding to the plurality of square shaped illustrations, and each of the smaller square-shaped sheets being removably attachable to the flat top sheet, a plush toy having a shape of a koala bear comprising a body, a right ear, a left ear, a right hand, a left hand, a right foot, and a left foot, the plush toy comprising:

a book having at least one inside page, the at least one inside page configured to hold at least one photograph, at least one re-recordable sound/voice module for recording stories, songs, and messages, a first button in the right ear that when pressed plays children's book stories, a second button in the left ear that when pressed plays soothing music, a volume button in the left hand, a button in the right hand that when pressed plays downloaded files, an on/off switch button in the left foot, and a USB and headphone port in the right foot, wherein the main story book is used in conjunction with the bed sheet and the plush toy to provide an improved and effective system of learning for children by providing related learning items on a bed sheet that a child sleeps on.

2. The learning system of claim 1, wherein the find word game includes yarn pieces that are movable to trace the words hidden within the plurality of spaced lettered indicia of the find word game.

3. The learning system of claim 1, further comprising a fitted bottom sheet having a cover of the main story book printed thereon.

4. The learning system of claim 1, further comprising a ball of yarn pieces that are movable to trace the words hidden within the plurality of spaced lettered indicia of the find word game.

5. The learning system of claim 1, further comprising at least one pillow case having encouraging affirmation indicia printed thereon.

6. The learning system of claim 1, wherein the plush toy further comprises a pillow and carrying straps.

* * * * *